Aug. 3, 1965 A. LE ROY LIMBERG 3,198,885

F.M. STEREOPHONIC RADIO SIGNAL RECEIVERS HAVING COMBINED PRE-DETECTION DE-EMPHASIS AND FILTERING CIRCUIT

Filed Feb. 16, 1962 2 Sheets-Sheet 1

INVENTOR:

ALLEN LEROY LIMBERG

BY Eugene M. Whitacre

ATTORNEY

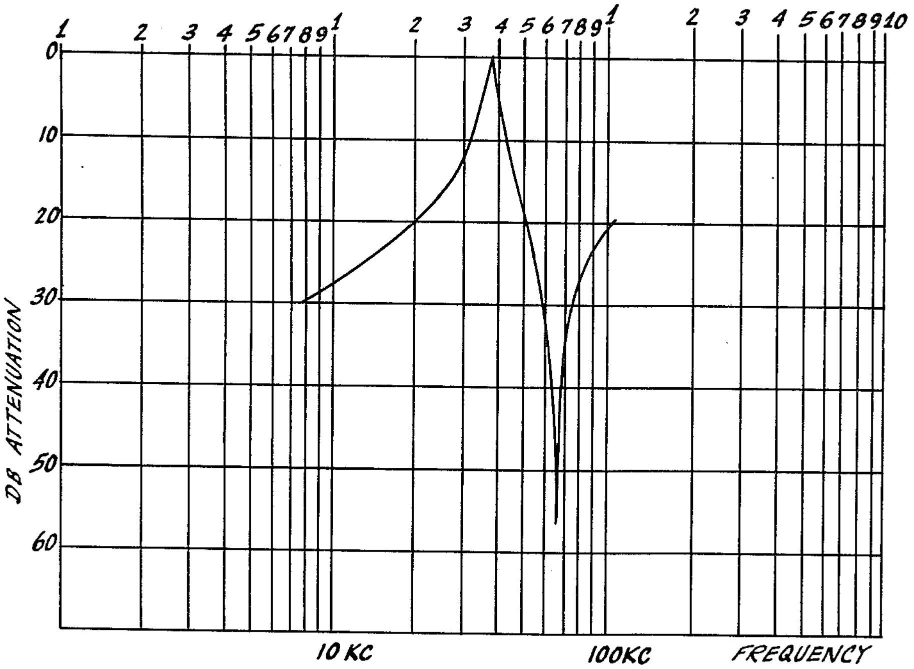
Fig. 3.
Fig. 4a.
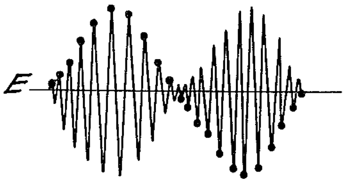
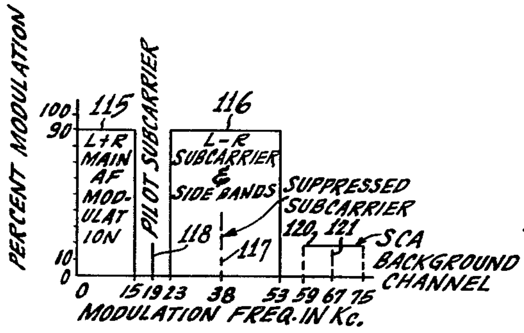
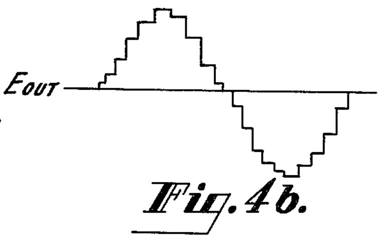
Fig. 4b.
Fig. 2.
INVENTOR.
ALLEN LEROY LIMBERG
BY Eugene M. Whitacre
ATTORNEY 3,198,885

F.M. STEREOPHONIC RADIO SIGNAL RECEIVERS HAVING COMBINED PRE-DETECTION DE-EMPHASIS AND FILTERING CIRCUIT

Allen Le Roy Limberg, Princeton, N.J., assignor to Radio Corporation of America, a corporation of Delaware Filed Feb. 16, 1962, Ser. No. 173,642
4 Claims. (Cl. 179—15)

The present invention relates to stereophonic multiplex radio signal receivers, and more particularly to compatible stereophonic multiplex frequency-modulation radio receivers which operate in response to both monophonic and stereophonic signal information on a single modulated carrier wave.

In such receivers, under the presently accepted method of broadcasting, the carrier wave is frequency-modulated by the sum of two modulating audio-frequency signals, such as two stereophonically-related left (L) and right (R) signals, as a single modulating signal in the usual manner for FM broadcast and compatible reception by existing monophonic receivers. However, in the multiplex system, the carrier wave further is simultaneously provided with stereophonic information effective for signal separation, in the form of a modulating suppressed carrier subcarrier signal which is amplitude-modulated with the difference of the two stereophonically related signals to be transmitted, and a pilot signal for use in demodulating the suppressed carrier signal.

The compatible composite stereophonic signal at the multiplex output circuit or terminal of the frequency-modulation detector of the multiplex receiver may thus be composed of the main frequency-modulation signal component, which is the compatible signal used by an unmodified monophonic frequency-modulation receiver, a 19 kc. (kilocycles per second) pilot signal, and the difference-frequency, $(L-R)$ signal, which is an AM double-sideband suppressed-carrier signal at 38 kc., the second harmonic of the pilot subcarrier. The sum and difference matrixing in conjunction with the AM suppressed-carrier subchannel permits a maximum of 90% modulation of the main carrier either by the sum $(L+R)$ modulation audio frequency signal itself, or the difference $(L-R)$ modulation-signal suppressed-carrier subchannel signal. The phase and frequency response of both the "sum" and "difference" signal channels are substantially the same over an audio-frequency range of 50–15,000 cycles (cycles per second) for example, and channel separation of 30 db can be attained.

In addition it is contemplated, in accordance with the present method of broadcasting, to provide SCA (Subsidiary Communications Authorization) background music or program material in a second subcarrier signal channel, that may be on a subcarrier frequency of 67 kc. and that can modulate the main carrier up to 10% with sidebands of approximately 8 kc. on each side, in an upper band between 59 kc. and 75 kc.

There are many existing frequency-modulation receivers in use that can be or are arranged for adaptation to stereophonic signal translation and reproduction by the provision of multiplex signal output connection means at the frequency-modulation detector and preceding the de-emphasis circuit. A stereophonic multiplex unit for separating and deriving the two stereophonically-related signals from a compatible stereophonic signal is thus desirable and can be made integral with and part of new receivers or applied as an adaptor unit to existing receivers.

In existing systems, the compatible composite stereophonic signal at the multiplex output circuit or terminal of the frequency-modulation detector, as hereinbefore referred to, is applied to the stereo multiplex unit which operates to separate the subcarrier or stereophonic information with a suitable highpass or bandpass filter means which provide a substantially flat frequency response from 23 kc. to 53 kc., after which the difference $(L-R)$ component is demodulated. By suitable matrix circuitry which follows, the demodulated subcarrier signal $(L-R)$ is subtracted from, and added to the sum signal $(L+R)$ component to obtain separate stereophonically-related or L and R signals which are then de-emphasized before being fed to two separate stereophonic signal output channels.

One problem which has been encountered in prior stereophonic FM multiplex units of the type described is that of excessive intermodulation distortion. This distortion results primarily from interaction between the 19 kc. pilot signal and the 38 kc. subcarrier wave with signals whose frequencies are nearly subharmonic to 38 kc. For example $(L+R)$ signals at 12⅔ kc. or 6⅓ kc., or detected subcarrier sidebands $(L-R)$ signals at these frequencies react with the 19 kc. pilot signal or the 38 kc. subcarrier wave to produce the undesired intermodulation distortion.

The intermodulation of pilot signal and reinserted stereophonic subcarrier with their subharmonics occurs in the non-linear detection mechanism of an FM stereo demodulator. The audio-frequency beat caused by this intermodulation is particularly objectionable since it is usually not harmonically related to the information involved in its generation and is distinguishable from "natural" intermodulation effects resulting from the actual program material, the acoustics of the hall and of the listening room, etc. The presence of 19 and 38 kc. in the detection process at a nearly constant level is assured; so the intermodulation may be sustained for noticeable periods on some program material, robbing it of brilliance.

The filters used in prior stereophonic demodulators for separating the subcarrier sidebands attempted to approximate a flat frequency bandpass from 23 kc. to 53 kc. to separate the subcarrier sidebands from the rest of the composite signal, however the cut-off characteristic for these filters for frequencies outside the desired passband is poor unless the filter is made complicated and expensive. Accordingly the 19 kc. and $(L+R)$ components which produce intermodulation distortion are fed to the subcarrier detector, and in addition the subcarrier sidebands which when detected produce signals at nearly the undesired subharmonic frequency arrive full strength at the subcarrier detector.

It is an object of this invention to provide an improved stereophonic multiplex unit for frequency modulation radio receivers.

It is a further object of this invention to provide an improved stereophonic multiplex unit for frequency modulation radio receivers which exhibits only a very small amount of intermodulation distortion.

In accordance with the invention the intermodulation distortion adverse effects are greatly reduced by the provision of predetection de-emphasis. The de-emphasis may be accomplished in connection with a filter circuit which separates the subcarrier sidebands from the remainder of the composite signal. The combined filter and de-emphasis network, in addition to selecting the subcarrier sidebands, attenuates the subcarrier sidebands so that the resultant audio frequency information demodulated therefrom is de-emphasized for high frequencies at approximately a rate of 75 microseconds. The relatively sharp characteristic of this filter network is such that those subharmonic components which react with the 19 kc. pilot signal or 38 kc. subcarrier wave to produce intermodulation distortion are highly attenuated. Thus the amount of intermodulation signal output, which is a product function, is therefore, greatly reduced.

Since the de-emphasis process in accordance with the invention is effected prior to detection of the subcarrier sidebands rather than subsequent thereto as in prior circuits, a balanced detector which does not provide high frequency components at the output terminals thereof is used as the subcarrier detector. By way of example, a ring demodulator or a balanced synchronous peak detector may be used in a multiplex unit employing predetection de-emphasis in accordance with the invention. The advantage of the combination of a balanced detector which does not pass the high frequency sideband or carrier component is that there is no additional requirement that additional low pass filters be used to prevent the components from entering the audio frequency channel where otherwise they might cause distortion. In addition, since there is no post-detection de-emphasis, there is no accentuation of the resultant low audio frequency intermodulation components by the de-emphasis of the higher frequencies which caused them.

The novel features which are considered to be characteristic of this invention are set forth with particularly in the appended claims. The invention, itself, however both as to its organization and method of operation will best be understood from the following description in which:

FIGURE 2 is a graph indicating the range of frequency spectrum and modulation components of a composite modulation signal as applied to the stereophonic multiplex unit of the circuit of FIGURE 1, with reference to certain operating features of the invention.;

Figure 1:
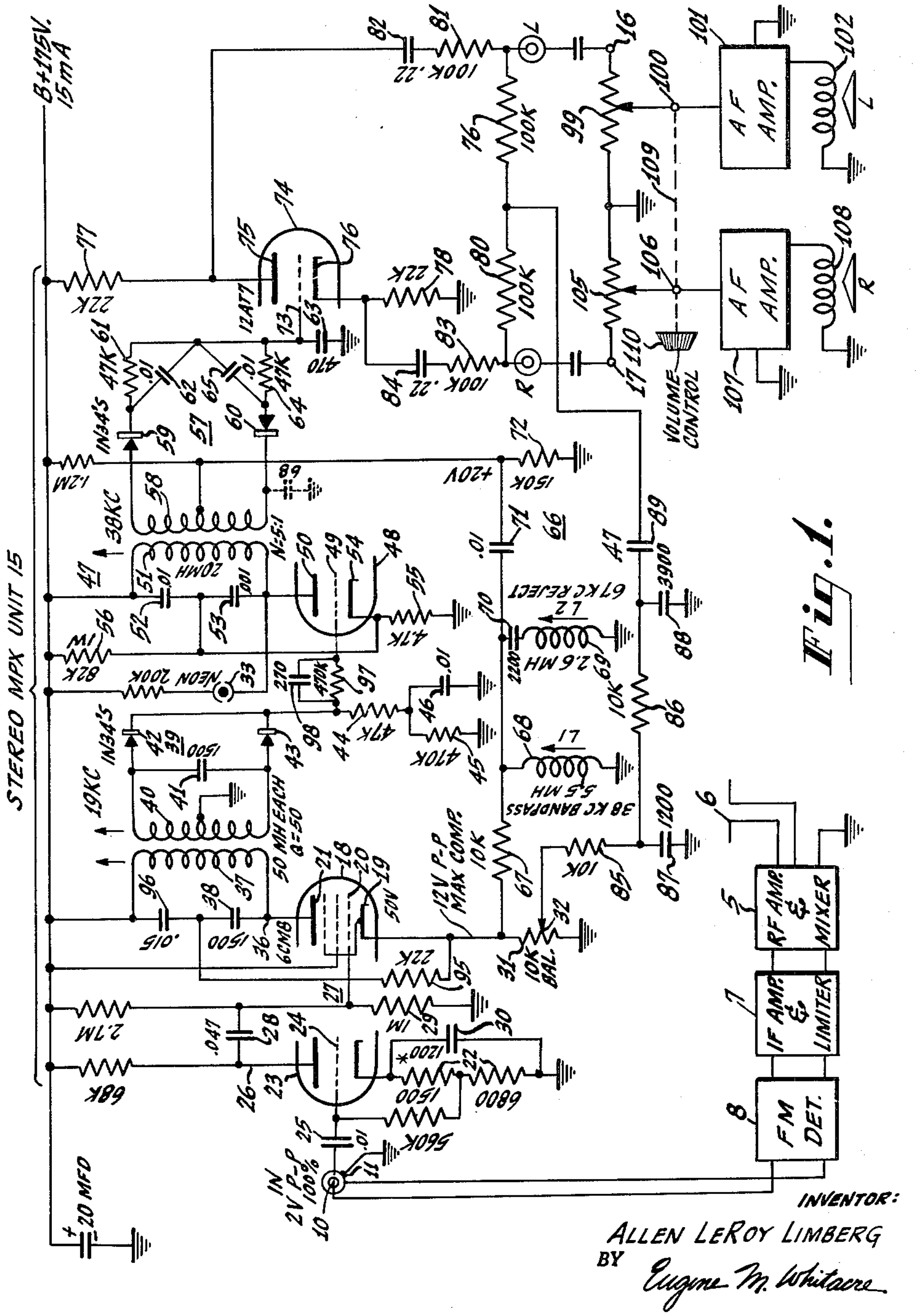
FIGURE 1 is a schematic circuit diagram of a multiplex demodulator and matrixing unit embodying the invention, and shown in connection with an FM receiver and audio amplifier shown in block form.

FIGURE 3 is a graph showing the frequency response characteristic of the subcarrier sideband separating filter and de-emphasis network used in the sterephonic multiplex unit of FIGURE 1; and FIGURES *4a* and *4b* are graphs showing the stereophonic sideband information for a cycle of a modulating signal, and the demodulated wave resulting therefrom after detection by the subcarrier detector shown in FIGURE 1.

Referring to the drawings and more particularly to FIGURE 1, the receiver circuit shown in block form is representative of any frequency modulation receiver which may be adapted for stereophonic multiplex operation. In this respect it is provided with the usual R-F amplifier and mixer 5 tunable through the frequency-modulation band of 88 to 108 mc., and coupled to antenna means 6 and the usual I-F amplifier and limiter 7 which is followed by a suitable FM detector 8. The FM detector 8 includes a pair of output terminals 10 and 11 across which are developed the main channel or $(L+R)$ signals, the subcarrier sidebands representative of the $(L-R)$ signal and the 19 kc. pilot signal.

Connected with the multiplex output circuit or terminals 10–11 of the FM detector 8 is a stereophonic multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

In the stereo multiplex unit 15, a signal amplifier stage is provided in connection with an amplifier tube 18 having a cathode 19, a control grid 20 and an output anode 21. In the present example this may be of the pentode portion of a pentode-triode tube for economy of construction. This stage may be coupled directly with the FM detector 8 output terminals 10–11, but in the present example is preferably coupled therewith through an intermediate signal amplifier stage comprising a triode amplifier tube 23 which may be the other half of the pentode-triode. The triode tube 23 has an input grid circuit 24 coupled to the terminal 10 through a coupling capaictor 25, and a cathode circuit including a resistor network 22 which is partially bypassed by a capacitor 30 to boost the high frequency response of the stage. An output plate circuit 26 for the tube 23 is coupled to the input grid 20 of the tube 18 through a grid circuit 27 including a coupling capacitor 28 and a grid resistor 29 connected between the grid 20 and ground. The cathode circuit of the tube 18 includes a resistor 31 having a movable tap 32. The plate or anode circuit 36 of the amplifier tube 18 is tuned to the pilot signal, which is 19 kc. in the present example, by a tunable winding 37 and shunt tuning capacitors 38 and 96. The junction of the capacitors 38 and 96 is coupled through a resistor 95 to the cathode 19.

Frequency doubling of the 19 kc. pilot signal is accomplished by the full wave rectifier circuit 39. The full wave rectifier 39 includes a grounded center tapped winding 40 which is coupled to the winding 37, and is tuned to the pilot signal frequency by a capacitor 41. In addition, the full wave rectifier frequency doubler includes a pair of diodes, which are shown as semiconductor diodes 42 and 43, the cathodes of which are connected together and the anodes of which are connected respectively to opposite ends of the winding 40. The direct current paths for the diodes 42 and 43 is completed through a pair of series connected resistors 44 and 45 to ground and the center tap of the winding 40. A capacitor 46 is connected in parallel with the resistor 45.

A modified Colpitts oscillator circuit 47 which is inoperative in the absence of the pilot signal includes a triode tube 48 which may comprise a portion of a dual-triode tube. The tube 48 includes a control grid 49 which is coupled throught a parallel resistor 97 capacitor 98 network to the junction between the diodes 42 and 43 and the resistor 44 to receive a turn-on voltage and a phase locking signal when a 19 kc. pilot signal is received. The anode 50 of the triode 48 is connected to a source of energizing potential +B, through a parallel resonant tank circuit tuned to 38 kc., which is twice the frequency of the pilot signal. The parallel resonant circuit includes a tunable inductor 51 across which a pair of series capacitors 52 and 53 are connected. The junction of the capacitors 52 and 53 is connected to the cathode 54 to sustain oscillation when the tube 48 is properly biased. During monophonic reception the tube 48 is cut-off because the cathode 54 is connected to receive a cut off bias from the junction of a pair of resistors 55 and 56, which are serially connected between the operating potential supply terminal +B and ground. When a pilot signal is received the direct voltage appearing across the resistors 44 and 45 permits the oscillator circuit to commence oscillation locked to the 38 kc. ripple component produced by the full wave rectification of the pilot signal.

A stereophonic reception indicator circuit comprising a neon tube 33, and a resistor 34 is connected between the oscillator tube anode and the +B terminal. The neon tube lights up only when the circuit 47 is oscillating, that is only during stereophonic signal reception.

A switching voltage at 38 kc. from the oscillator circuit 47 is coupled to a balanced synchronous peak detector circuit 57 which is operative to derive the (*L*—*R*) signal components from the subcarrier signal sidebands. The detector circuit 57 includes a center tapped winding 58 which is coupled to the oscillator tank circuit inductor 51, and a pair of diodes 59 and 60. The anode of the diode 59 is connected to one end of the winding 58, and the cathode thereof is coupled through a parallel resistor 61, capacitor 62 network to ground by way of a capacitor 63. The cathode of the diode 60 is connected to the opposite end of the winding 58, and the anode thereof is coupled through a parallel resistor 64, capacitor 65 network to the capacitor 63 and hence to ground.

The subcarrier sidebands containing the (*L*—*R*) signal information are inserted into the detector circuit 57 at the center tap of the winding 58. To this end it should be noted that the composite demodulated FM signal including the (*L*+*R*) 19 kc. pilot signal and the subcarrier wave sidebands appear at the cathode 19 terminal of the amplifier 18. To select the subcarrier wave sidebands a combined filter and de-emphasis network 66 couples the cathode 19 to the center tap of the winding 58. The filter and de-emphasis includes a series resistor 67, a shunt inductor 68, and a trap circuit comprising an inductor 69 and capacitor 70 which are series resonant at 67 kc., the frequency of an (SCA) channel which may also be transmitted on the same carrier. The inductor 68 resonates with the effective capacitance thereacross at a frequency of 38 kc., the center frequency of the subcarrier channel, and attenuates signals on either side of 38 kc. The overall characteristic of the network is such that the high frequencies of the resultant demodulated signals are attenuated at approximately a rate of 75 microseconds to provide high frequency de-emphasis. Such de-emphasis compensates for the high frequency pre-emphasis added at the transmitter to improve the overall signal to noise ratio of the FM transmission and receiving system.

A blocking capacitor 71 couples the signal output from the filter 66 to a resistor 72 connected between the center tap of the winding 58 to ground.

Demodulated subcarrier sideband signals (*L*—*R*) are developed across the capacitor 63 and applied to the control grid 73 of the triode tube 74 which is connected as a phase splitter. The tube 74 includes an anode 75 and cathode 76 which are connected respectively through load impedance elements 77, 78 to the operating potential supply source B+, and to ground.

A matrix network including a pair of series connected resistors 79 and 80 are coupled to receive opposite phases of the (*L*—*R*) signal from the phase splitter stage 74. One end of the resistor 79 is coupled to the anode 75 through an isolating resistor 81 and a coupling capacitor 82 to receive the +(*L*+*R*) signal, and one end of the resistor 80 is coupled to the cathode 76 through an isolating resistor 83 and a coupling capacitor 84, to receive the —(*L*—*R*) signal.

The (*L*+*R*) signal, derived from the cathode 19 of the amplifier 18, is applied between the junction of the resistors 79 and 80 and ground. The pilot signal and subcarrier sidebands as well as other high frequency components which may be present at the cathode 19 are effectively removed by the high frequency de-emphasis circuit comprising the series resistors 85 and 86 and the shunt capacitors 87 and 88. The time constant of this de-emphasis network taking into account the loading by the resistors 79 and 80 is approximately 75 microseconds. The de-emphasis network for the L+R signals is coupled to the matrix network by way of a coupling capacitor 89. The (*L*+*R*) signal adds to the +(*L*—*R*) and —(*L*—*R*) signals respectively to produce the left and right stereophonic signals at the terminals 16 and 17 respectively. Adjustment of the tap 32 on the variable resistor 31 provides the proper amount of (*L*+*R*) signal to the matrix circuit so that the addition and subtraction of the (*L*+*R*) and (*L*—*R*) signals produces the proper signal output at the terminals 16 and 17.

The radio receiver signal translating system includes suitable means connected with the terminals 16 and 17 of the stereo multiplex unit to amplify and reproduce the two channel signals, which are here assumed to be the left and right, or L and R, audio-frequency signals which are stereophonically-related. To this end, the terminal 16 is connected to system ground through an output volume-control potentiometer resistor 99 having an output volume control contact 100 connected with a suitable audio frequency channel amplifier 101, as indicated, which has a common ground return connection 12 and is connected to drive a left-channel output loudspeaker 102.

Likewise the output terminal 17 is connected to system ground 12 through a second channel volume-control potentiometer resistor 105 having an output volume control contact 106 connected to the second channel amplifier means 107, having a common ground return connection 12 and a right channel output loudspeaker 108 connected therewith as shown. As is customary, the volume-control means are gang-connected for joint operation as indicated by the dotted line connection 109 and the common volume control knob represented at 110 in connection therewith. This dual-channel signal translating circuit and sound-reproducing output means therefor is representative of any suitable means of this type normally provided in a stereophonic sound reproducing system.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along with X axis and percentage modulation along the Y axis which also indicates relative amplitudes of subcarrier signals. It will be seen that the total signal is composed of an (*L*+*R*) component 115 which may provide as much as 90% modulation and an (*L*—*R*) double-sideband suppressed-carrier AM signal component 116 which may also modulate the carrier up to 90% as indicated, but 180° out of phase with the modulation provided by the main modulation component 115. In other words when the component 115 is maximum the component 116 is minimum.

In the graph of FIGURE 2 it is assumed that the audio-frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc. as indicated, thereby to provide for substantially the full 15 kc. modulation referred to.

The possible SCA background music channel is indicated by the block 120 and extends 8 kc. on either side of a 67 kc. sub-carrier signal indicated by the dotted line 121.

When a stereophonic FM signal is being received by the FM receiver, a composite signal as represented in FIGURE 2 is developed across the output terminals of the FM detector 8. Since the response of the stages preceding the stereo multiplex unit 15 may "roll-off" at high frequencies, that is provide less gain at high frequencies, the overall receiver front end frequency response may be made flat by designing the amplifier stage 23 to provide more gain at the higher frequencies. This is done in the present example by selecting the resistance value of the network 22 and the capacitance of the capacitor 30 to provide low frequency degeneration or high frequency boost in proportion to the amount of high frequency roll-off in the preceding stages.

The resultant signal is linearly amplified in the stage 18, with the 19 kc. pilot signal being developed in the tuned anode 36 circuit, and the composite signal in the cathode 19 circuit. Because of the unbypassed cathode resistor 31, there is degeneration to reduce the gain of the stage for the 19 kc. pilot signal. The gain is improved for 19 kc. signals by the regenerative feedback effected through the resistor 95 from the junction of the capacitors 38 and 96 in the anode tank circuit to the cathode 31.

The full wave rectifier-frequency doubling circuit 39 receives the 19 kc. pilot signal energy from the tuned anode 36 circuit. On the half cycles where the top terminal of the winding 40 is positive, the diode 43 is cut-off and the diode 42 conducts current which flows through the resistors 44 and 45 back to the center tap of the winding 40. On opposite half cycles the diode 42 is cut-off and the diode 43 conducts through the same path. After a few cycles determined by the time constant of the resistor 44 and capacitor 46, the capacitor 46 charges up to a positive voltage almost equal to the peak voltage of the signals across each half of the winding 40. Since the resistor 44 is not bypassed by the capacitor 46, a pronounced voltage pulse is produced thereacross at a 38 kc. rate, or two pulses for each cycle of the 19 kc. pilot tone. The discharge time constant for the resistor 45 capacitor 46 network is adjusted to control the conduction angle of the diodes. In practice, excellent operational characteristics were observed when each diode conducted for 30° per cycle of 19 kc. pilot signal energy. This conduction angle produces only a very slight loading on the amplifier stage 18, and thereby contributes to the phase stability of the system.

During monophonic reception, the oscillator does not operate because of the positive voltage applied to the cathode thereof, and noise at 19 kc. does not tend to turn the oscillator on because of the time-constant of the resistor 44 capacitor 46 network. When the positive voltage from the full wave rectifier frequency doubler circuit 39 exceeds the threshold voltage at the cathode 48 set by the voltage divider 55–56, the circuit oscillates and is locked in frequency and phase to the 38 kc. pulses applied to the grid 49. It will be noted that the capacitor 98 provides a low impedance path for the 38 kc. synchronizing pulses, and the resistor 97 provides isolation between the negative voltage which tends to build up at the grid when the oscillator begins oscillating, and the positive voltage which develops across the resistors 44 and 45.

The 38 kc. voltage appearing at the anode 50 is applied to a neon lamp 33, which lights up to provide an indication that stereophonic signals are being received.

The fact that the oscillator output voltage is necessary for the detection of the subcarrier sidebands, and this output voltage is produced only when a stereophonic signal is received, provides an automatic stereophonic-monophonic control for the receiver.

The 38 kc. oscillator output voltage and the subcarrier sidebands are applied to the balanced synchronous switch detector 57 to derive the original $L-R$ signal information. One of the problems encountered in previous FM multiplex subcarrier detectors for stereophonic signal transmission is that of severe intermodulation distortion. It has been found that one of the primary causes of this distortion is the intermodulation between the pilot signal (19 kc.) and the regenerated subcarrier (38 kc.), with signal information which is nearly subharmonic to the 38 kc. subcarrier frequency. For example $(L+R)$ signals at 9.5 kc., 6⅓ kc., 12⅔ kc. or detected $(L-R)$ signals at these frequencies react with the 19 kc. pilot signal or 38 kc. subcarrier in the subcarrier detector to produce the undesired intermodulation distortion. The intermodulation of the pilot signal residue and reinserted stereophonic subcarrier with their subharmonics occurs in the nonlinear detection mechanism of an FM stereo demodulator. The audio-frequency beat caused by this intermodulation is particularly objectionable since it is usually not harmonically related to the information involved in its generation and is thus distinguishable from "natural" intermodulation effects resulting from the nonlinear translation of the actual program material. The presence of the 38 kc. in the detection process at a nearly constant level is assured; so that unrelated notes resulting from intermodulation can be sustained for noticeable periods on some program material, thereby producing objectionable effects in the sound output.

Prior stereophonic subcarrier demodulators have attempted to separate the subcarrier sidebands (38 kc.±15 kc.) from the other information with filters approximating a flat frequency passband characteristic from 23 kc. to 53 kc. However, the approximation to flatness has been poor since the cut-off characteristics for signals outside the 23 kc.–53 kc. band is not steep unless the filter is made complicated and expensive. Thus these prior filters permit some of the 19 kc. pilot signal and some of the $(L+R)$ signal corresponding to subharmonics of 19 kc. to reach the subcarrier detector, which not only reduces the stereophonic signal separation, but these signals contain components which produce the undesirable intermodulation distortion. Furthermore, those components of the subcarrier sidebands which when detected correspond to the troublesome subharmonics are applied without attenuation to the subcarrier detector.

The intermodulation distortion problem is greatly reduced in the present circuit by the provision of predetection de-emphasis. In the present case the de-emphasis is effected in connection with the filter circuit 66 which separates the subcarrier sidebands from the remainder of the signal. The inductor 68 of the filter 66 resonates with the effective capacity of the circuit 69–70 at 38 kc. The series inductor 69-capacitor 70 resonate at 67 kc. to provide better SCA channel rejection than could be obtained with a simple parallel resonant circuit. In addition the series resonant circuit tends to make the overall filter 66 response symmetrical on an arithmetic scale rather than a logarithmic scale which is the case with a simple parallel resonant circuit. The filter 66, in combination with the resistor attenuates the subcarrier sidebands in such a manner that the resulting detected $(L-R)$ audio frequency signal high frequency information is de-emphasized at a rate of 75 microseconds. The response of this network is shown in FIGURE 3. The exact proportions of the elements depend upon how much the preceding stages have attenuated the high frequency signal components, that is, on how much high frequency roll-off occurs in the preceding tuner. In the present case the tuner roll-off is compensated by a complementary amount of high frequency gain in the amplifier stage 23.

It can be seen from the graph of FIGURE 3 that the filter-de-emphasis network attenuates the 67 kc. SCA subcarrier signal 57 db, the 19 kc. pilot signal 21 db, and the main channel audio components in excess of 25 db. Since the 19 kc. pilot signal and the subharmonic components thereof in $L+R$ channel are greatly attenuated, the amount of intermodulation between these components is also attenuated. In like manner, the subcarrier sideband frequencies which when detected produce audio frequencies subharmonically related to the pilot signal (such as 38 kc.±9.5 kc.) are also attenuated to also reduce the intermodulation distortion. In this regard it should be noted that the intermodulation output is a product function of the intermodulating signals.

Other circuit configurations may be devised to provide predetection de-emphasis as will be apparent to persons skilled in the art.

The predetection de-emphasis provides another advantage in that any intermodulation distortion which is produced in the subcarrier detector is not emphasized. To illustrate, in prior multiplex units audio signals at about 6 kc. could interact with the 19 kc. pilot signal to produce about a 1 kc. intermodulation product. (The third harmonic of 6 kc. intermodulating with 19 kc.) Following detection, the signal was passed through a de-emphasis network where the 6 kc. signal from which the intermodulation product originated is attenuated relative to the resultant 1 kc. signal. This process has the effect of emphasizing the intermodulation product relative to the rest of the signal.

However, where predetection de-emphasis is used, any intermodulation output from the detector is not emphasized in the manner described above, thereby providing an effective reduction in such distortion so far as the listener is concerned.

Another feature which tends to reduce the amount of intermodulation distortion in the circuit of FIGURE 1 is the use of the full wave rectifier frequency doubler connected in a balanced circuit configuration. With the balanced circuit, the 19 kc. pilot tone is not fed to the oscillation along with the 38 kc. component. As a result, the danger of the 19 kc. pilot signal reaching the subcarrier detector thorugh the oscillator channel is materially reduced.

Since the de-emphasis process is effected prior to detection rather than subsequent thereto in the multiplex unit 15, it is desirable to use a detector which does not have high frequency components corresponding to the pilot signal, subcarrier, subcarrier sidebands or the like in its output. The reason for this is that the high frequency energy may cause distortion in succeeding amplifier stages by driving these amplifiers sufficiently away from the center of the linear portion of their dynamic range, that the desired audio signals drive these amplifiers into nonlinear regions. In addition, the undesired high frequency energy may cause other undesirable effects such as heating of the loudspeaker voice coils.

The balanced synchronous peak detector 57 provides a high ratio of desired audio to spurious frequency output with no additional filtering requirements. To understand the operation of the detector 57 ignore for the moment the subcarrier sideband connections and assume that the center tap of the winding 58 is grounded, and that only the 38 kc. oscillator voltage is applied to the diodes 59 and 60. Assuming no diode losses, the cathode voltage of diode 59 will after several cycles of input voltage, reach a positive D.-C. level which corresponds to the peak value of the applied oscillator voltage since the time constant of the resistor 61-capacitor 62 is long compared to the period of the 38 kc. input source. Under these conditions, the diode 59 current flows for a very few degrees of each cycle, or in other words the diode represents an open circuit except for the brief time of conduction. The conduction angle can be controlled by selection of the amplitude of the oscillator voltage and the values of the resistor 61-capacitor 62 network. The diode 60 operates in exactly the same manner and conducts during the same portion of the input cycle, except that the D.-C. voltage delivered to the resistor 64-capacitor 65 is negative but equal to the positive voltage developed across the resistor 61-capacitor 62 network.

Since there are equal and opposite voltages at the remote ends of the resistors 61 and 64, and these resistors are of equal value, there is no current flow from, or to the junction of these resistors so there is none at the hypothetically grounded center tap of the winding 58. If a D.-C. voltage is applied between the center tap of the winding 58 and ground, the capacitor 63 will be charged to that level each time one of the diodes conducts, and since there is no discharge path (except through the diodes) this potential will be maintained across the capacitor 63.

The circuit operates in the same manner when the subcarrier sidebands are applied between the center tap of the winding 58 and ground. With reference to FIGURE

*4a*, the wave form E represents a double sideband suppressed carrier signal which is applied to the center tap of the winding 58. If the oscillator switching voltage which is large relative to the sideband signal amplitude is phased so that the diodes conduct at the times indicated by the dots, the output voltage across the capacitor 63 will be similar to that shown in FIGURE *4b*, which is a step approximation of the original modulating wave. (It should be noted that the negative portions of the modulating voltage cause the subcarrier sidebands to reverse in phase by 180° with respect to the positive portions of the modulating wave.) The resultant step approximation wave form has very little harmonic distortion and the amplitude of the spurious (higher frequency) output components is much less than that of the desired signal, becoming zero when the subcarrier sideband voltage goes to zero. In other words, the detector is balanced with respect to the 38 kc. oscillator switching voltage, so that none of this voltage is applied to the phase splitter 74, and the conduction angle of the diodes 59 and 60 is small enough to prevent the unbalanced subcarrier sidebands and other high frequency components from being applied to the phase splitter.

The subcarrier demodulation and matrixing circuit described is simple and economical to build and adjust as compared to contemporary circuits for accomplishing the same function. The circuit includes a simple and highly efficient subcarrier sideband detector, which provides an audio signal output with very little distortion, and at the same time balances out or blocks higher frequency components corresponding to the 38 kc. oscillator switching voltage, the subcarrier sidebands and the like.

The circuit described also exhibits a very low intermodulation distortion characteristic and does not produce an emphasized intermodulation product as a result of the predetection pre-emphasis of the subcarrier sidebands and the use of the very linear detector. The use of the balanced synchronous peak detector in combination with the predetection de-emphasis permits economy in the circuit design in that additional filters are not required in the L and R output channels to remove the high frequency components.

In addition to the foregoing the circuit also provides automatic stereophonic-monaural reception control and indication, in that the oscillator does not operate unless a stereophonic signal is received. In combination with the balanced synchronous peak detector, the normally inoperative oscillator circuit provides improved noise immunity during monophonic reception since there is no oscillator switching voltage present to detect SCA or other high frequency signals which may be applied to the detector.

What is claimed is:

1. A multiplex decoding circuit for stereophonic frequency modulation receiving systems comprising:

(a) a signal input circuit for connection to a frequency modulation receiver to receive pre-emphasized subcarrier sideband signals therefrom modulated in accordance with one of a pair of stereophonically-related audio signals, (b) a subcarrier detector for deriving the audio signal information from said subcarrier sideband signals, (c) a combined filter and de-emphasis circuit coupling said signal input circuit to said subcarrier detector, (d) said filter circuit including a series resonant circuit tuned to a frequency higher than that of said subcarrier, said higher frequency corresponding to the center frequency of an unwanted signal which may modulate the main frequency modulation carrier wave, and an inductor connected in parallel with said series resonant circuit to resonate with the effective capacitance thereof at the frequency of the first named subcarrier, and (e) a resistor coupled between said signal input circuit and said filter circuit, said resistor being of a value with respect to the other parameters of said filter circuit such that said filter circuit and resistor attenuate said subcarrier sidebands substantially symmetrically on an arithmetic scale with respect to said subcarrier frequency to de-emphasize the higher audio frequencies derived at said subcarrier detector in a manner substantially complementary to the pre-emphasis of said one of a pair of stereophonically related signals.

2. A multiplex decoding circuit for stereophonic frequency modulation receivers comprising:

(a) a signal input circuit for connection to a frequency modulation receiver to receive therefrom a pilot signal and pre-emphasized subcarrier sideband signals modulated in accordance with one of a pair of stereophonically related audio signals, (b) means providing a balanced, synchronous, peak subcarrier detector for deriving the audio signal information from said subcarrier sideband signals, (c) said subcarrier detector comprising a bridge circuit including a pair of rectifier devices and a pair of impedance elements, corresponding ones of said rectifier devices and impedance elements being connected in series, (d) means for applying a demodulating signal harmonically related to said pilot signal across one diagonal of said bridge circuit, (e) filtering and de-emphasis circuit means coupled to said signal input circuit having an amplitude vs frequency characteristic which is substantially symmetrical, on an arithmetic scale, about the center frequency of said subcarrier sidebands and provides progressively more attenuation to sidebands which progressively increase and decrease in frequency from said center frequency to de-emphasize the higher audio frequencies derived from said subcarrier detector in a manner substantially complementary to the pre-emphasis of said one of a pair of stereophonically related signals, and (f) an output impedance element for said subcarrier detector coupled in series with said filtering and de-emphasis circuit means across the other diagonal of said bridge circuit to develop across said output impedance element audio frequency signals derived from said sideband signals to the substantial exclusion of said demodulating signal and said subcarrier sideband signals.

3. In a stereophonic frequency modulation receiver for receiving a stereophonic frequency modulation wave which is frequency modulated by (a) the sum of a pair of stereophonic signals, (b) a double sideband suppressed subcarrier wave of 38 kc. amplitude modulated by the difference between said pair of stereophonic signals and (c) a 19 kc. pilot signal; said receiver including (d) a frequency demodulator for recovering the composite signal modulating said frequency modulation wave, the combination comprising:

(e) means coupled to said frequency demodulator for separating said 19 kc. pilot signal from the remainder of the composite signal;

(f) means for doubling the frequency of said separated pilot signal to provide a 38 kc. subcarrier wave;

(g) a filter including a series resonant combination of a capacitor and an inductor tuned to 67 kc and an inductor connected in parallel with said series resonant combination to resonate with the effective capacitance thereof at 38 kc., a resistor coupled between said filter and said frequency demodulator and being of a value with respect to the parameters of said filter to attenuate signals at frequencies greater than and less than 38 kc. such that the detected sideband signals are deemphasized symmetrically with respect to said 38 kc. subcarrier wave according to a circuit time constant of approximately 75 microseconds;

(h) means providing a balanced synchronous peak subcarrier detector comprising a pair of impedance elements and a pair of rectifier devices connected in a bridge circuit with corresponding ones of said impedance elements and said rectifier devices being connected in series, means for applying said 38 kc. subcarrier wave across one diagonal of said bridge circuit, and means coupling said filter and an output impedance element in series across the other diagonal of said bridge circuit, said rectifier devices being poled to conduct at substantially the same time in response to one polarity of said 38 kc. subcarrier wave, an audio frequency signal corresponding to the difference between said stereophonic signals being developed across said output impedance element to the substantial exclusion of said 38 kc. subcarrier wave and said subcarrier sideband signals, said combination further comprising matrixing circuit means coupled to said subcarrier detector to receive said audio difference signal, (i) a deemphasis circuit coupled between said frequency demodulator and said matrix circuit to apply said sum signals to said matrix circuit, (j) output terminals for said matrix network at which said stereophonic signals are separately developed;

(k) and a dual channel audio amplifier coupled to said output terminals to amplify said separate stereophonic signals.

4. A multiplex decoding circuit for stereophonic modulation receivers comprising:

(a) a signal input circuit for connection to a frequency modulation receiver to receive therefrom a pilot signal and pre-emphasized subcarrier sideband signals modulated in accordance with one of a pair of stereophonically related audio signals, (b) a balanced peak subcarrier detector for deriving the audio signal information from said subcarrier sideband signals, (c) said subcarrier detector comprising a pair of impedance elements and a pair of rectifier devices connected in a bridge circuit with corresponding ones of said impedance elements and said rectifier devices being connected in series, (d) means for applying a demodulating signal harmonically related to said pilot signal across one diagonal of said bridge circuit, (e) a combined filter and de-emphasis circuit coupling said signal input circuit to said subcarrier detector, (f) said filter circuit including a series resonant combination of an inductance and a capacitance tuned to a frequency higher than that of said demodulating signal, said higher frequency corresponding to the center frequency of an unwanted signal which may modulate the main frequency modulation carrier wave, and a second inductance coupled in parallel with said series resonant combination to resonate with the effective capacitance thereof at the frequency of said subcarrier, and a resistor coupled between said signal input circuit and said filter circuit, said resistor having a value with respect to the parameters of said filter circuit such that said combined filter and de-emphasis circuit has an amplitude vs frequency characteristic which is substantially symmetrical, on an arithmetic scale, about said subcarrier frequency, said combined filter and de-emphasis circuit providing progressively more attenuation to sideband frequencies which progressively increase and decrease from said subcarrier frequency to de-emphasize the higher audio frequencies derived at said subcarrier detector in a manner substantially complementary to the pre-emphasis of said one of a pair of stereophonically related signals, said decoding circuit further comprising (g) an output impedance element for said subcarrier detector coupled in series with said filter and deemphasis circuit across the other diagonal of said bridge circuit to develop across said output impedance element audio frequency signals derived from said sidebands to the substantial exclusion of said demodulating signal and said subcarrier sideband signals.

References Cited by the Examiner

UNITED STATES PATENTS

| | | | |
|---|---|---|---|
| 3,085,203 | 4/63 | Logan | 325—65 |

| | | | |
|---|---|---|---|
| 3,099,707 | 7/63 | Dome | 179—15 |
| 3,122,610 | 2/64 | Csicsatka | 179—15 |

OTHER REFERENCES

Audio, August 1961, pp. 26–28, 32 and 34.

Audio, January 1962, pp. 35, 36, 38 and 69.

Electronics World, January 1962, pp. 50–52, 80, 81.

Feldman: Audio, July 1961, pp. 25–27 and 62.

Recklinghausen: "Stereophonic FM-Receiver and Adaptors," August 1961, pp. 1–7.

DAVID G. REDINBAUGH, *Primary Examiner.*